US011928216B2

United States Patent
Subramanian et al.

(10) Patent No.: US 11,928,216 B2
(45) Date of Patent: Mar. 12, 2024

(54) PROTECTING AN ENTIRE SYSTEM DISK BY ENCRYPTING DATA STORED IN A PORTION OF THE SYSTEM DISK

(71) Applicant: VMware LLC, Palo Alto, CA (US)

(72) Inventors: Samyuktha Subramanian, Mountain View, CA (US); Jesse Pool, Ottawa (CA); Petr Vandrovec, Palo Alto, CA (US); Viswesh Narayanan, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 460 days.

(21) Appl. No.: 17/127,696

(22) Filed: Dec. 18, 2020

(65) Prior Publication Data

US 2022/0198021 A1  Jun. 23, 2022

(51) Int. Cl.
*G06F 21/57* (2013.01)
*G06F 11/14* (2006.01)
*G06F 21/78* (2013.01)
*H04L 9/08* (2006.01)
*G06F 9/4401* (2018.01)
(Continued)

(52) U.S. Cl.
CPC ........ *G06F 21/575* (2013.01); *G06F 11/1435* (2013.01); *G06F 11/1464* (2013.01); *G06F 21/572* (2013.01); *G06F 21/78* (2013.01); *H04L 9/0897* (2013.01); *G06F 9/4401* (2013.01); *G06F 2201/84* (2013.01); *G06F 2221/033* (2013.01)

(58) Field of Classification Search
CPC .............. G06F 21/575; G06F 11/1435; G06F 11/1464; G06F 21/572; G06F 21/78; G06F 9/4401; G06F 2201/84; G06F 2221/033; G06F 11/1446; G06F 11/1484; G06F 21/44; G06F 21/6227; G06F 21/72; H04L 9/0897; H04L 9/3234; H04L 9/3247
USPC ................................................ 713/1, 2, 100
See application file for complete search history.

(56) References Cited

U.S. PATENT DOCUMENTS

2022/0201014 A1\* 6/2022 Saha ....................... G06N 20/00
2023/0115278 A1\* 4/2023 Turner ................ G06F 11/1469
718/1

OTHER PUBLICATIONS https://docs.microsoft.com/en-us/windows/security/information-protection/bitlocker/bitlocker-overview-and-requirements-faq, Feb. 28, 2019.

(Continued)

*Primary Examiner* — Michael J Brown
(74) *Attorney, Agent, or Firm* — King Intellectual Asset Management

(57) ABSTRACT

A method for protecting an OS disk of a computing device without block encrypting the OS disk. The method identifies one or more files that store configuration data associated with OS binaries executed on the computing device. The method encrypts the configuration data stored in the one or more files using an encryption key and seals the encryption key to a TPM of the computing device. The method then boots the computing device by attempting to unseal the encryption key by authenticating one or more of the OS binaries with the TPM. When authenticating the one or more of the OS binaries is successful, the method completes boot of the computing device by decrypting the configuration data using the encryption key. If authentication of the one or more of the OS binaries is not successful, however, the method aborts boot of the computing device.

20 Claims, 4 Drawing Sheets

(51) Int. Cl.
 *G06F 21/72* (2013.01)
 *H04L 9/32* (2006.01)

(56) References Cited

OTHER PUBLICATIONS https://docs.microsoft.com/en-us/windows/security/information-protection/bitlocker/bitlocker-deployment-and-administration-faq, 2/29/2019.
https://docs.vmware.com/en/VMware-vSphere/6.5/com.vmware.vsphere.security.doc/GUID-5D5EE0D1-2596-43D7-95C8-0B29733191D9.html, May 31, 2019.

* cited by examiner

PROTECTING AN ENTIRE SYSTEM DISK BY ENCRYPTING DATA STORED IN A PORTION OF THE SYSTEM DISK

BACKGROUND

A software-defined datacenter includes several host machines in communication over a physical network infrastructure, each host machine having one or more virtual computing instances (VCIs), such as virtual machines (VMs), containers, etc. Similar to other computing devices, host machines (and applications running on their VCIs) are susceptible to malicious attacks. For example, a host machine's state including user-configurable (or auto-generated) data that contains critical and sensitive information about the services running on the host machine can be easily stolen, or tampered with, if an attacker finds momentary access to the host machine. As an example, an unauthorized user may unplug a hard drive from a host machine and plug it into another computing device to steal the data stored on the hard drive.

To protect the data, commercial solutions have conventionally used block-by-block encryption of the entire hard drive to prevent such malicious attacks. For example, to increase the level of security, empty blocks of the hard drive may be encrypted to prevent potential access to deleted data (e.g., data that has been stored in the empty blocks at some prior time, but deleted since). Such encryption approaches to protect the data, however, can cause major performance bottlenecks during system boot, or worse yet, every read and/or write operation. There is a need for a solution that circumvents the performance issues of block-by-block encryption, and at the same time, protects the integrity of a hard drive (e.g., an operation system disk).

DETAILED DESCRIPTION

Figure 1:
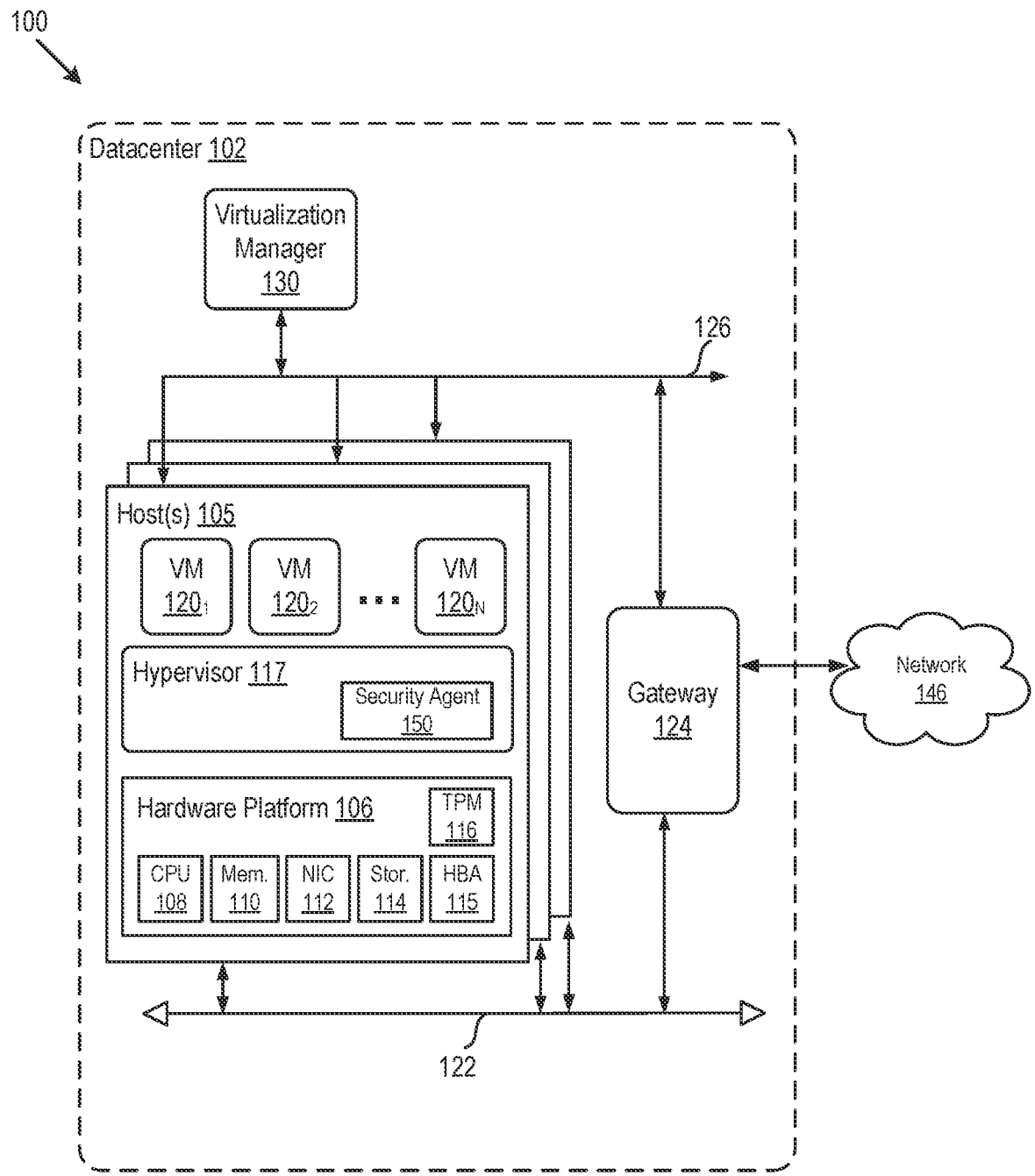
FIG. 1 depicts a block diagram of a computer system in which one or more embodiments of the present disclosure may be utilized.

To protect the data stored on a disk, conventional disk encryption methods block-encrypt the disk. That is, every block of data stored on a disk would be encrypted to protect the data against unauthorized access. In some cases, as discussed above, every block of the hard drive, regardless of storing current or deleted data, may be encrypted. To encrypt the data, some hosting systems may apply a particular encryption algorithm, such as an advance encryption standard (AES) algorithm, to each data block of, for example, an operating system (or system) disk. Such block-by-block encryption, however, can become a bottleneck during different disk operations, such as disk booting, disk reading, disk writing, etc., which may substantially slow down the overall performance of a host machine.

Accordingly, some embodiments provide a security mechanism that protects the data stored on a system disk of a computing device, such as a host machine, without block encrypting the entire disk. Only a small portion of the system disk of a host machine, in some such embodiments, may be encrypted with a key that is bound to a verified and known state of the host machine. After each boot, if the host machine determines that it is in the verified known state, the key may be used to decrypt the small portion of encrypted data and then load this data into memory, otherwise the boot may fail. As such, data stored on a system disk may easily be accessed during the different disk operations since plain data (e.g., non-encrypted data) is loaded into memory (e.g., instead of having to decrypt and re-encrypt the data during disk operations).

Data stored on a system disk may be broadly classified as operating system (OS) binaries (e.g., images) and configuration data (e.g., admin-configured non-volatile state). The OS binaries may include read-only executable source (or machine) codes that run on a computing device after booting of the computing device to launch the operating system. Configuration data may include data that is required for OS binaries (e.g., and binaries of other services) to run. File system data, network configuration data, and configuration data associated with other services (e.g., key-related data in an attestation service) are a few examples of configuration data required for OS binaries to execute.

In some embodiments, a process, such as a backup process, that runs on a host machine may persist the configuration data in one or more files, for example, periodically. In some embodiments, a security agent executing on the host machine (e.g., in the hypervisor of the host machine) may identify the file(s) that stores the configuration data and encrypt its data using an encryption key. In certain embodiments, the security agent may be root-configurable and/or admin-configurable (e.g., only an administrator may be authorized to configure the security agent to the host machine to prevent compromising the security of the host machine). The security agent may create the encryption key and seal it, as described in detail below, to a known, good state of the host machine measured by a trusted platform module (TPM) of the host machine. Instead of, or in conjunction with, sealing the key to the measured values recorded by the TPM (which recorded the known, good state), the encryption key, in some embodiments, may be sealed to another key (e.g., a binary signing key) with which the measured values are signed in order to add an additional layer of abstraction to the sealing process. For example, sealing the encryption key to another key that signs the measured values (instead of sealing it to the measured values themselves) makes the sealing/unsealing process independent of potential future changes in the measured values. For example, if the measured values change due to launching of a new version of software (e.g., an update or a new patch), no additional and lengthy unsealing and resealing process may be needed.

After sealing the encryption key to a known, good state of the host machine, each time the host machine boots, the key may be released to the security agent to decrypt the configuration data only if it is determined that the host machine is in the known, good state during the booting process. This way, if the installation bundle containing the core OS binaries is tampered with, the security agent may detect the change(s) and forgo unsealing of the encryption key which, in turn, may result in a boot failure (e.g., since the encrypted configuration data necessary for the binaries to run cannot be decrypted).

In some embodiments, a secure boot process (e.g., ESXi™ Secure Boot provided by VMware®) may be responsible for ensuring that every binary other than the OS binaries (e.g., binaries that are associated with other installation bundles) is signed by a known verified private key. Since the OS binaries have already been signed and verified (e.g., by the bootloader), the secure boot process may guarantee that the other binaries are also verified and secure. In some such embodiments, since the remaining installation bundles (e.g., other than the core OS binaries) are signed by a private key (e.g., during the secure boot process), any binary that is not a part of the verified installation bundles will be prevented from running on the host machine. In some embodiments, the secure boot process may be part of the good, known state of the host machine. As such, decryption of the configuration data may also be dependent on the successful execution of the secure boot process in some embodiments.

Combining the above described TPM sealing mechanism with the secure boot process may guarantee the security of the entire system disk, despite having a much smaller number of files being encrypted (e.g., compared to encryption of every data block of the system disk). For example, by leveraging the TPM sealing mechanism, a trusted core system (e.g., a known, verified OS kernel) may be guaranteed to be launched after each boot. Subsequently, the trusted core system may launch the secure boot process, which in turn, guarantees that all other components on the system disk are signed and verified by a trusted source and only binaries packaged in these signed components may be able to run.

In other words, the read-only files (e.g., the image) is protected from tampering by the secure boot process. Any tampering may be detected by the step-by-step signature verification process that takes place at boot time. On the other hand, read-write files (e.g., the user configurable data) are encrypted and integrity protected by tying the encryption key to the known, good state of the system measured by the TPM, which may depend on the secure boot process having launched and run successfully. This way, the entire system disk may be protected by encrypting only a small portion of the system disk (e.g., a few megabytes worth of data files) as opposed to encrypting the entire system disk (e.g., which may include tens of gigabytes of data).

FIG. 1 depicts a block diagram of a computer system 100 in which one or more embodiments of the present disclosure may be utilized. Computer system 100 may include a datacenter 102 connected to a network 146. Network 146 may be, for example, a direct link, a local area network (LAN), a wide area network (WAN), such as the Internet, another type of network, or a combination of these networks.

Datacenter 102 may include host(s) 105, a virtualization manager 130, a gateway 124, a management network 126, and a data network 122. Datacenter 102 may include additional components (e.g., a disturbed data storage, etc.) that are not shown in the figure. Networks 122, 126, in one embodiment, may each provide Layer 2 or Layer 3 connectivity in accordance with the Open Systems Interconnection (OSI) model, with internal physical or software defined switches and routers not being shown. Although the management and data network are shown as separate physical networks, it is also possible in some implementations to logically isolate the management network from the data network (e.g., by using different VLAN identifiers).

Each of hosts (or host machines) 105 may be constructed on a server grade hardware platform 106, such as an x86 architecture platform. For example, hosts 105 may be geographically co-located servers on the same rack.

Hardware platform 106 of each host 105 may include components of a computing device, such as one or more central processing units (CPUs) 108, system memory 110, a network interface 112, storage system 114, a host bus adapter (HBA) 115, a trusted platform module (TPM) 116, and other I/O devices, such as, for example, USB interfaces (not shown). Network interface 112 may enable host 105 to communicate with other devices via a communication medium, such as data network 122 or management network 126. Network interface 112 may include one or more network adapters, which may also be referred to as network interface cards (NICs). In certain embodiments, data network 122 and management network 126 may be different physical networks as shown, and the hosts 105 may be connected to each of the data network 122 and management network 126 via separate NICs or separate ports on the same NIC. In certain embodiments, data network 122 and management network 126 may correspond to the same physical or software defined network, but different network segments, such as different VLAN segments.

Storage system 114 represents a system disk along with other persistent storage devices (e.g., one or more other hard disks, flash memory modules, solid state disks, non-volatile memory express (NVMe) drive, and/or optical disks). The storage devices of storage system 114 may be internal to host 105, or may be external to host 105 and shared by a plurality of hosts 105, coupled via HBA 115 or NIC 112, such as over a network. Storage 114 may be a storage area network (SAN) connected to host 105 by way of a distinct storage network (not shown) or via data network 122, e.g., when using iSCSI or FCoE storage protocols. Storage 114 may also be a network-attached storage (NAS) or another network data storage system, which may be accessible via NIC 112 in some embodiments.

Host 105 may be configured to provide a virtualization layer, also referred to as a hypervisor 117, that abstracts processor, memory, storage, and networking resources of hardware platform 106 into multiple virtual machines 1201 to 120N (collectively referred to as VMs 120 and individually referred to as VM 120) that run concurrently on the same host. Hypervisor 117 may run on top of the operating system in host 105. In some embodiments, hypervisor 117 can be installed as system level software directly on hardware platform 106 of host 105 (often referred to as "bare metal" installation) and be conceptually interposed between the physical hardware and the guest operating systems executing in the virtual machines. Hypervisor 117 may include different modules, agents, etc., that run on the hypervisor to perform different functions. For example, security agent 150 may execute in hypervisor 117 to implement security related operations on different components of host 105. One of these operations, as described in more detail below, may relate to encryption of a system disk of host 105 to prevent unauthorized users from accessing critical and sensitive data (e.g., related to services that run on host machine 105) stored on the system disk.

In some implementations, the hypervisor may comprise system level software as well as a "Domain 0" or "Root Partition" virtual machine (not shown) which is a privileged virtual machine that has access to the physical hardware resources of the host and interfaces directly with physical I/O devices using device drivers that reside in the privileged virtual machine. Although the disclosure is described with reference to VMs, the teachings herein also apply to other types of virtual computing instances (VCIs), such as containers, Docker containers, data compute nodes, isolated user space instances, namespace containers, and the like. In certain embodiments, instead of VMs 120, the techniques may be performed using containers that run on host 105 without the use of a hypervisor and without the use of a separate guest operating system running on each container.

Virtualization manager 130 may communicate with hosts 105 via a network, shown as a management network 126, and carries out administrative tasks for datacenter 102, such as managing hosts 105, managing VMs 120 running within each host 105, provisioning VMs, migrating VMs from one host to another host, and load balancing between hosts 105. Virtualization manager 130 may be a computer program that resides and executes in a central server in datacenter 102 or, alternatively, virtualization manager 130 may run as a virtual computing instance (e.g., a VM) in one of the hosts 105. Although shown as a single unit, virtualization manager 130 may be implemented as a distributed or clustered system. That is, virtualization manager 130 may include multiple servers or virtual computing instances that implement management plane functions.

Although hosts 105 are shown as including a hypervisor 117 and virtual machines 120, in an embodiment, hosts 105 may include a standard operating system instead of a hypervisor 117, and hosts 105 may not include VMs 120. In such an embodiment, datacenter 102 may not include virtualization manager 130.

Gateway 124 may provide hosts (or host machines) 105, VMs 120, and other components in datacenter 102 with connectivity to one or more networks used to communicate with one or more remote datacenters or other entities, such as one or more software repository servers (e.g., for installing new software and/or upgrading the already installed software on hosts 105), one or more key management servers (e.g., for receiving encryption keys by hosts 105), etc. Gateway 124 may manage external public Internet Protocol (IP) addresses for VMs 120 and route traffic incoming to and outgoing from datacenter 102 and provide networking services, such as firewalls, network address translation (NAT), dynamic host configuration protocol (DHCP), and load balancing. Gateway 124 may use data network 122 to transmit data network packets to hosts 105. Gateway 124 may be a virtual appliance, a physical device, or a software module running within host 105.

Figure 2:
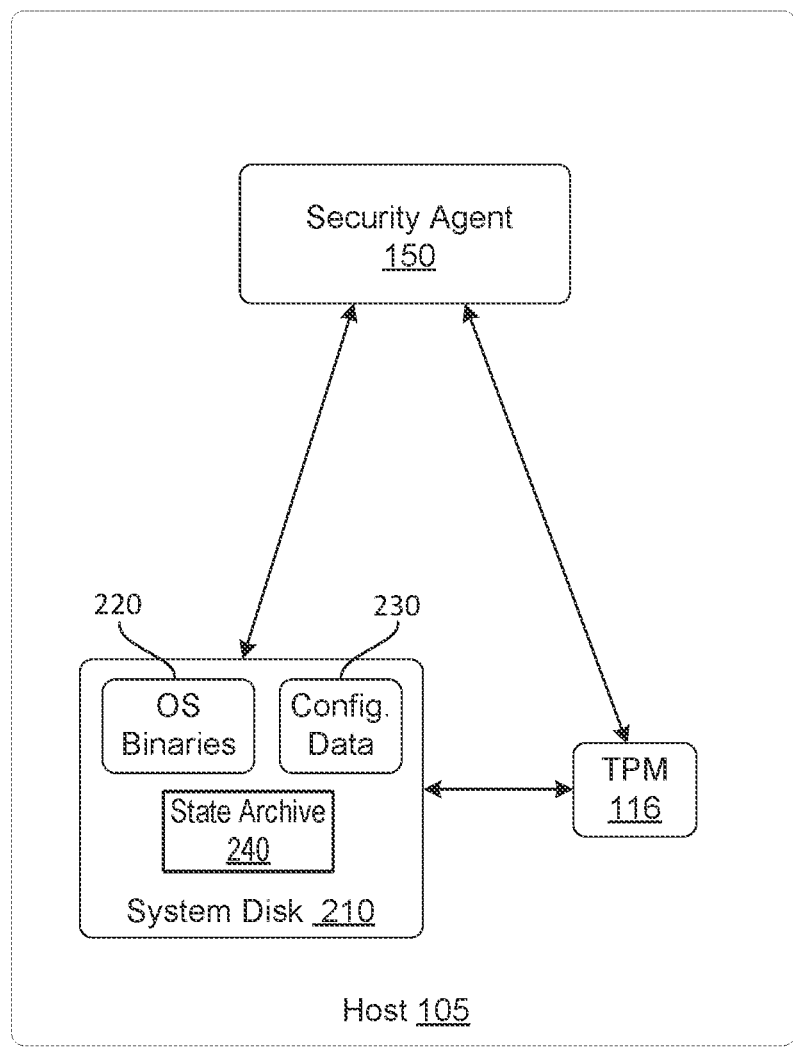
FIG. 2 is a block diagram illustrating communication between different components of a host machine for encrypting a portion of a system disk for protecting the system disk, according to an example embodiment of the present application.

FIG. 2 is a block diagram 200 illustrating communication between different components of a host machine 105 for encrypting a portion of a system disk for protecting the system disk, according to an example embodiment of the present application. Host 105 may include, among other components, a system disk 210, a TPM 116, and a security agent 150. Security agent 150 may reside in hypervisor 117, as shown in FIG. 1, or may be independent of hypervisor 117. TPM 116 may be a tamper resistant piece of cryptographic hardware or processor in host 105, which may implement cryptographic functions (e.g., computing hash functions, key generation and management, random number generation, integrity measurements, etc.) for platform authentication.

System disk 210 may be one of many storage devices of storage system 114, as described above, with reference to FIG. 1. System disk 210 may include OS binaries 220 and configuration data 230 for booting of host 105 and performing other OS operations on host 105. Configuration data 230 may include data that is required for OS binaries 220 (e.g., and binaries of other services) to execute. In some embodiments, an internal backup process that runs periodically on the host machine (e.g., on ESXi) may store the latest version of configuration data in a file (also known as state archive) 240. In some embodiments, security agent 150 may read the state archive file 240 on host 105 and encrypt the configuration data this file stores using an encryption key. The security agent may seal the encryption key to TPM 116 (e.g., to a verified known state of host 105). For unsealing the encryption key during a boot process, TPM 116 may first determine whether the verified known state has been reached before releasing the encryption key. That is, the TPM may ensure that a trusted core system including verified OS binaries has been launched first and then unseal the encryption key to security agent 150. Upon receiving the encryption key, security agent 150 may decrypt the encrypted configuration data using the encryption key received from TPM 116.

In some embodiments, TPM 116 may include several different platform configuration registers (PCRs) for recording measured values (e.g., hashes) of the binaries. Each PCR may be a memory location in TPM 116 that contains a hash value for a component of a software (e.g., operating system software) that is generated based on launch of the component binaries and measured by TPM 116. For example, each time host 105 boots, different modules or components of the OS software may be launched as OS binaries on host 105, hashes of the OS binaries may be generated and measured into TPM 116, and the measured hashes may be recorded in a set of PCRs of TPM 116.

Sealing the encryption key to TPM 116, or to a known, good state of host 105, may include a process by which authorization to access the encryption key may depend on a preset policy or a state of TPM 116 or host 105. The policy may generally depend on the values of one or more PCRs of TPM 116. Since PCRs record measured binaries of the software launched, sealing the key to one or more of the PCR values used to verify the software binaries may make access to the key conditional upon TPM's trust in those binaries. As an example, some of the PCRs (e.g., PCRs 0 through 7) may have a well-defined value after the boot process (e.g., after launching the OS) of host 105. If later one or more of the hardware, firmware, or boot loader of host 105 change, the change may be immediately detected in the PCR values.

In some embodiments, instead of, or in conjunction with, sealing the encryption key to the PCR values, the key may be sealed to another key (e.g., a binary signing key) with which the measured binaries stored in the PCRs are signed. That is, in some embodiments, a layer of abstraction may be added to the sealing/unsealing process to make the process independent of the PCR values. This way, if the PCR values change, for example, due to installation of an updated version of the software, there is no need for unsealing the key and resealing it to the new values, which can be time consuming. In some embodiments, as part of a software build process, the final measured values of the TPM PCRs may be determined and signed by an asymmetric binary signing key. The signature (or signed binaries) may be configured to the host machine on which the software bundle is installed (e.g., on which the software binaries may run) as part of the host machine image.

After the encryption key is sealed to the binary signing key, at each boot stage of host 105, TPM 116 may use the public part of the binary signing key to verify that the values recorded in the set of PCRs were the values used to generate the signatures in the host machine image. Once the signatures are verified, the encryption key may be released or unsealed to security agent 150 to decrypt the encrypted configuration data. In other words, instead of verifying the actual hashes of the software modules recorded in the PCRs, the binary signing key may have been used to generate a signature based on the hash values of the PCRs (e.g., at build-time), and the TPM uses well-known public key cryptography verification methods to make sure that the measured values were used to generate the signatures at build-time of the software. In some embodiments, the private part of the binary signing key may be kept at and stay secure by the creator of the binary signing key (e.g., VMware®).

Figure 3:
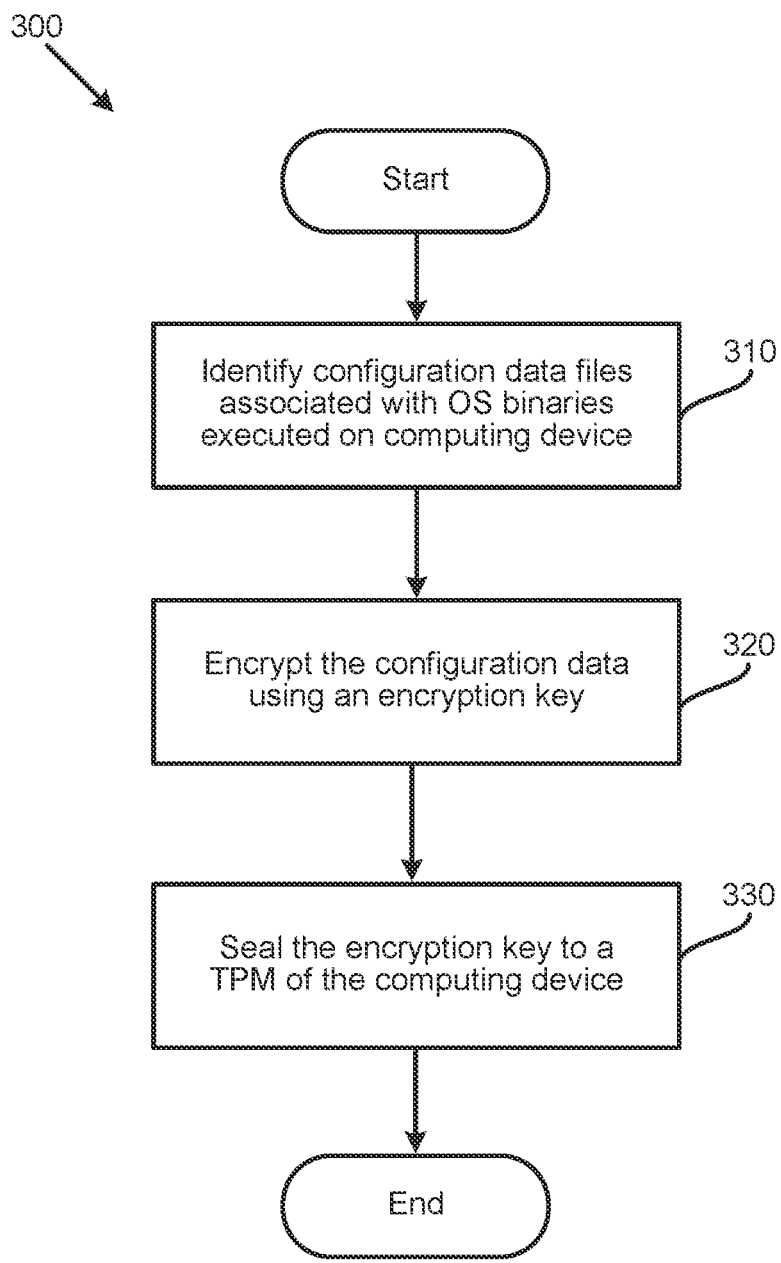
FIG. 3 is a flowchart illustrating an example process/method for encrypting configuration data with a key and sealing the key to a state of the host machine, according to an example embodiment of the present application.

FIG. 3 is a flowchart illustrating an example process/method 300 for encrypting configuration data with a key and sealing the key to a state of the host machine, according to an example embodiment of the present application. Process 300 may be performed, for example, by a module or agent, such as security agent 150 described with reference to FIG. 2 in some embodiments. Process 300 may begin, at 310, by identifying the configuration data stored in one or more files, such as state archive file 240 shown in FIG. 2. The configuration data may include data that is required by the binaries to execute on a computing device, such as host 105. As described above, the last state of configuration data may be stored in the file(s) periodically by a backup process.

At 320, process 300 may encrypt the configuration data with an encryption key and seal the key, at 330, to a TPM of the computing device (e.g., to a set of values recorded by the TPM). The process may then end. As described above, sealing the encryption key to a TPM of the computing device may include binding the encryption key to a verified known state of the TPM or computing device. For example, some embodiments may bind the encryption key to hash values recorded in some of the PCRs of the TPM during a known, good boot process of the computing device. Some other embodiments, as described above, may bind the encryption key to a binary signing key used to sign the hash values recorded in the PCRs. In some embodiments, as described below with reference to FIG. 4, during each boot process of the computing device, the encryption key may be released (or unsealed) only if the computing device reaches its verified known state (e.g., to which the encryption key is bound).

Figure 4:
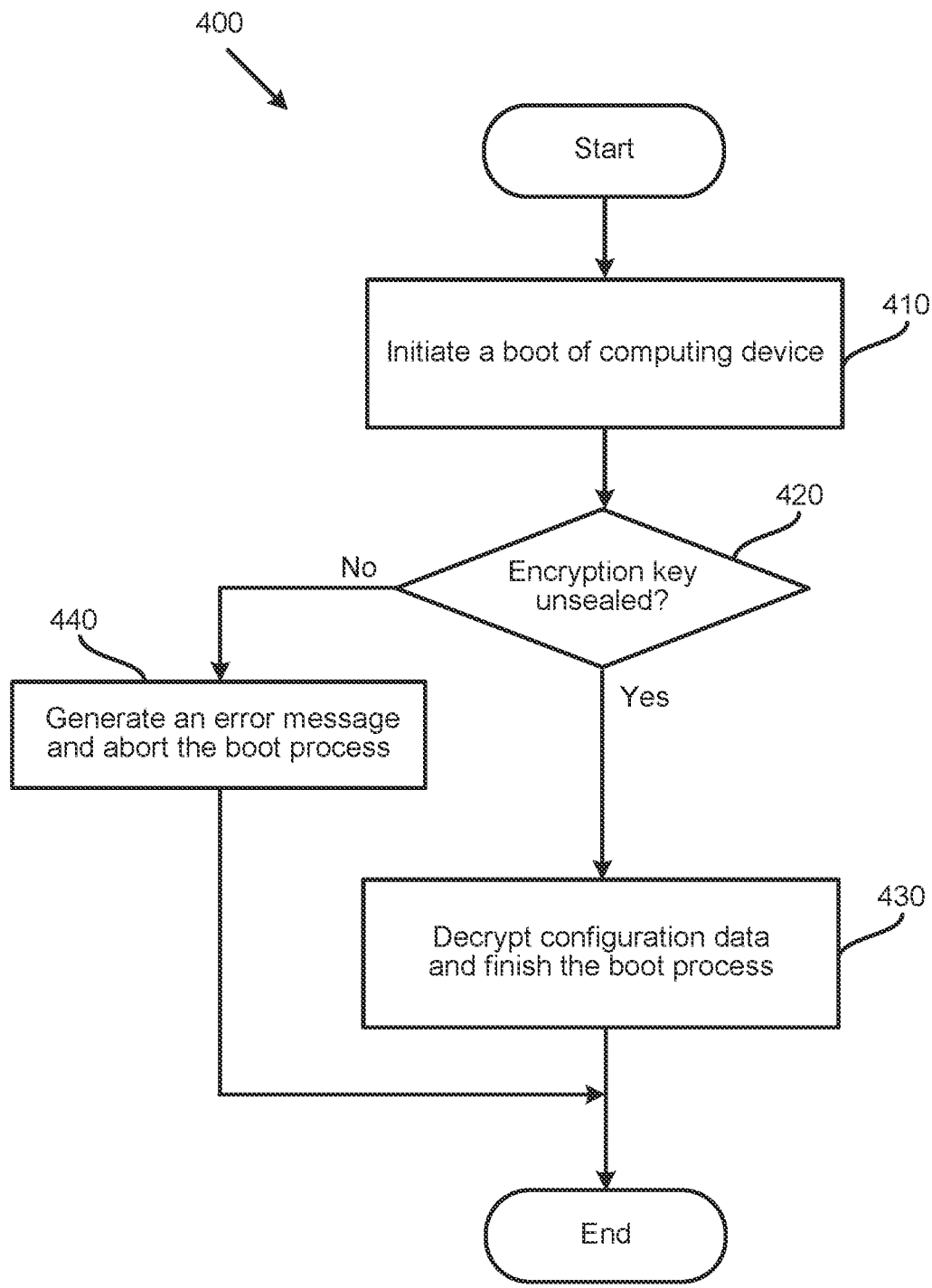
FIG. 4 is a flowchart illustrating an example process/method for completing or aborting a boot process by unsealing the encryption key, according to an example embodiment of the present application.

FIG. 4 is a flowchart illustrating an example process/method 400 for completing or aborting a boot process based on unsealing the encryption key, according to an example embodiment of the present application. In some embodiments, the process may be performed by security agent 150, or a combination of security agent 150 with one or more other agent(s) or modules of the computing device.

Process 400 may start, at 410, by initiating a boot process on a computing device, such as host 105. Process 400 may then determine, at 420, whether the encryption key is unsealed or not. For example, at some point during the boot process, the TPM may determine whether the computing device has reached its known, good state or not. The TPM may make such determination by determining whether the hash values stored in a set of PCRs match the hash values associated with the known, good state, or by using well-known public key cryptography verification methods to make sure that the measured PCR values were signed by the private portion of the binary signing key at build-time of the software.

When the TPM determines that the known, good state has not been reached, for example, after determining that the hash values or the signatures are not verified, the TPM will not unseal the encryption key, otherwise it unseals the key, for example, to security agent 150. When process 400 determines, at 420, that the encryption key is not unsealed, the process may generate, at 430, an error message and abort the boot process. The error message may inform a user or administrator of the computing device of the security of the device being compromised. The process may then end. On the other hand, when process 400 determines, at 420, that the encryption key has been unsealed (e.g., when the process receives the key from the TPM), the process may decrypt, at 440, the encrypted configuration data, for example, for the OS binaries to use. The process may then finish the boot process and end.

In some embodiments, a secure boot process, such as ESXi™ Secure Boot (provided by VMware®), may verify that other binaries (e.g., other than the OS binaries), such as binaries of other installation bundles, are authenticated. In some such embodiments, since only these trusted software bundles are verified by the secure boot process, any other binary that is not a part of the verified installation bundles may be prevented from running on the host machines. The trusted software bundles may be configured to host machines, for example, through a trusted software repository, such as a vSphere® installation bundle (VIB) depot provided by VMware®, or through other means. In some embodiments, the secure boot process may be part of the good, known state of the host machine. As such, decryption of the configuration data may also be dependent upon the successful execution of the secure boot process in some embodiments. Combining the above described mechanisms (e.g., TPM sealing with the secure boot process) ensures that the entire system disk is protected without a need for encryption of every data block of the system disk. For example, by leveraging the TPM sealing mechanism, a trusted core system (e.g., a known, verified OS kernel) may be guaranteed to be launched after each boot.

This way, the read-only files (e.g., the image) may be protected from tampering by the secure boot process. Any tampering may be detected by the step-by-step signature verification process that takes place at boot time. On the other hand, read-write files (e.g., the user configurable data) are encrypted and integrity protected by tying the encryption key to the known, good state of the system measured by the TPM, which may depend on the secure boot process having launched and run successfully.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing.

Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), NVMe storage, Persistent Memory storage, a CD (Compact Discs), CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

In addition, while described virtualization methods have generally assumed that virtual machines present interfaces consistent with a particular hardware system, the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and datastores are somewhat arbitrary, and particular operations are illustrated in the context of specific illustrative configurations. Other allocations of functionality are envisioned and may fall within the scope of one or more embodiments.

In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s). In the claims, elements and/or steps do not imply any particular order of operation, unless explicitly stated in the claims.

What is claimed is:

1. A method for protecting an operating system (OS) disk of a host computing device without block encrypting the OS disk in entirety, comprising:
    identifying a portion of the OS disk of the host computing device, the portion of the OS disk including one or more files that store configuration data associated with OS binaries executed on the host computing device;
    encrypting, using an encryption key, only the portion of the OS disk;
    sealing the encryption key to a trusted platform module (TPM) of the host computing device; and
    booting the host computing device comprising:
        attempting to unseal the encryption key by authenticating one or more of the OS binaries with the TPM;
        when authenticating the one or more of the OS binaries is successful, completing boot of the host computing device by decrypting the portion of the OS disk using the encryption key to obtain the configuration data; and
        when authenticating the one or more of the OS binaries is not successful, aborting boot of the host computing device.

2. The method of claim 1, wherein the configuration data comprises data required for the OS binaries to execute.

3. The method of claim 1, wherein a backup process stores a last state of the configuration data in the one or more files periodically.

4. The method of claim 1, wherein the TPM includes a plurality of platform configuration registers (PCRs), wherein sealing the encryption key to the TPM comprises binding the encryption key to a second key with which first measured values stored in a subset of the plurality of PCRs are signed during a build process of the OS binaries.

5. The method of claim 4, wherein the TPM authenticates the one or more of the OS binaries by:
    signing second measured values of the subset of PCRs associated with the one or more of the OS binaries by a public part of the second key during a boot of the host computing device; and
    comparing the signed second measured values with the signed first measured values of the subset of PCRs during the build process.

6. The method of claim 1, wherein the TPM includes a plurality of platform configuration registers (PCRs), wherein sealing the encryption key comprises binding the encryption key to first measured values stored in a subset of the plurality of PCRs during a known clean boot of the host computing device.

7. The method of claim 6, wherein the TPM authenticates the one or more of the OS binaries by comparing second measured values associated with the one or more of the OS binaries during a subsequent boot of the host computing device with the first measured values stored in the subset of the plurality of PCRs during the known clean boot.

8. The method of claim 1, wherein completing boot of the host computing device further comprises subsequent to decrypting the configuration data launching a secure boot process that verifies that binaries, other than the OS binaries, running on the OS disk are authenticated.

9. A non-transitory computer readable medium comprising instructions that, when executed by one or more processors of a computing system, cause the computing system to perform a method for protecting an operating system (OS) disk of a host computing device without block encrypting the OS disk in entirety, the method comprising:
    identifying a portion of the OS disk of the host computing device, the portion of the OS disk including one or more files that store configuration data associated with OS binaries executed on the host computing device;
    encrypting, using an encryption key, only the portion of the OS disk;
    sealing the encryption key to a trusted platform module (TPM) of the host computing device; and
    booting the host computing device comprising:

attempting to unseal the encryption key by authenticating one or more of the OS binaries with the TPM;
when authenticating the one or more of the OS binaries is successful, completing boot of the host computing device by decrypting the portion of the OS disk using the encryption key to obtain the configuration data; and
when authenticating the one or more of the OS binaries is not successful, aborting boot of the host computing device.

10. The non-transitory computer readable medium of claim 9, wherein a backup process stores a last state of the configuration data in the one or more files periodically.

11. The non-transitory computer readable medium of claim 9, wherein the TPM includes a plurality of platform configuration registers (PCRs), wherein sealing the encryption key to the TPM comprises binding the encryption key to a second key with which first measured values stored in a subset of the plurality of PCRs are signed during a build process of the OS binaries.

12. The non-transitory computer readable medium of claim 11, wherein the TPM authenticates the one or more of the OS binaries by:
signing second measured values of the subset of PCRs associated with the one or more of the OS binaries by a public part of the second key during a boot of the host computing device; and
comparing the signed second measured values with the signed first measured values of the subset of PCRs during the build process.

13. The non-transitory computer readable medium of claim 9, wherein the TPM includes a plurality of platform configuration registers (PCRs), wherein sealing the encryption key comprises binding the encryption key to first measured values stored in a subset of the plurality of PCRs during a known clean boot of the host computing device.

14. The non-transitory computer readable medium of claim 13, wherein the TPM authenticates the one or more of the OS binaries by comparing second measured values associated with the one or more of the OS binaries during a subsequent boot of the host computing device with the first measured values stored in the subset of the plurality of PCRs during the known clean boot.

15. The non-transitory computer readable medium of claim 9, wherein completing boot of the host computing device further comprises subsequent to decrypting the configuration data launching a secure boot process that verifies that binaries, other than the OS binaries, running on the OS disk are authenticated.

16. A computer system, comprising:
a memory; and
a processor coupled to the memory, the processor being configured to:
identify a portion of an OS disk of a host computing device, the portion of the OS disk including one or more files that store configuration data associated with OS binaries executed on the host computing device;
encrypt, using an encryption key, only the portion of the OS disk;
seal the encryption key to a trusted platform module (TPM) of the host computing device; and
boot the host computing device comprising:
attempting to unseal the encryption key by authenticating one or more of the OS binaries with the TPM;
when authenticating the one or more of the OS binaries is successful, completing boot of the host computing device by decrypting the portion of the OS disk using the encryption key to obtain the configuration data; and
when authenticating the one or more of the OS binaries is not successful, aborting boot of the host computing device.

17. The computer system of claim 16, wherein the configuration data comprises data required for the OS binaries to execute.

18. The computer system of claim 16, wherein the TPM includes a plurality of platform configuration registers (PCRs), wherein sealing the encryption key to the TPM comprises binding the encryption key to a second key with which first measured values stored in a subset of the plurality of PCRs are signed during a build process of the OS binaries.

19. The computer system of claim 18, wherein the TPM authenticates the one or more of the OS binaries by:
signing second measured values of the subset of PCRs associated with the one or more of the OS binaries by a public part of the second key during a boot of the host computing device; and
comparing the signed second measured values with the signed first measured values of the subset of PCRs during the build process.

20. The computer system of claim 16, wherein the TPM includes a plurality of platform configuration registers (PCRs), wherein sealing the encryption key comprises binding the encryption key to first measured values stored in a subset of the plurality of PCRs during a known clean boot of the host computing device, wherein the TPM authenticates the one or more of the OS binaries by comparing second measured values associated with the one or more of the OS binaries during a subsequent boot of the host computing device with the first measured values stored in the subset of the plurality of PCRs during the known clean boot.

* * * * *